United States Patent [19]

McKinney et al.

[11] Patent Number: 5,658,117
[45] Date of Patent: Aug. 19, 1997

[54] CLAMP CONNECTOR FOR A FRONT END LOADING REFUSE COLLECTION VEHICLE

[75] Inventors: Bobby Ray McKinney, Fort Payne, Ala.; Thomas L. Price, Avondale, Ariz.

[73] Assignee: The Heil Company, Chattanooga, Tenn.

[21] Appl. No.: 516,747

[22] Filed: Aug. 18, 1995

[51] Int. Cl.$^6$ .................................................. B65F 3/04
[52] U.S. Cl. .......................... 414/408; 403/234; 414/724
[58] Field of Search .................................. 414/406, 408, 414/421, 546, 723, 724; 403/233–235, 237, 239, 258, 260, 289; 248/62, 74.1, 74.2

[56] References Cited

U.S. PATENT DOCUMENTS

| | | |
|---|---|---|
| 2,370,334 | 2/1945 | Wachter ................................. 414/546 |
| 2,828,032 | 3/1958 | Beasley et al. . |
| 3,112,834 | 12/1963 | Dempster et al. . |
| 3,140,787 | 7/1964 | Clar . |
| 3,217,913 | 11/1965 | Aldredge et al. . |
| 3,661,285 | 5/1972 | Appleman . |
| 4,043,684 | 8/1977 | Lacroix .......................... 403/235 X |
| 4,074,787 | 2/1978 | Cunningham et al. ............ 414/408 X |
| 4,479,625 | 10/1984 | Martz ................................. 248/74.1 |
| 4,550,891 | 11/1985 | Schäty .......................... 248/74.2 X |
| 4,692,089 | 9/1987 | Rodgers et al. ..................... 414/724 |
| 4,886,411 | 12/1989 | Pieperhoff et al. ............. 414/406 X |
| 5,304,014 | 4/1994 | Slutz .............................. 414/724 X |
| 5,423,501 | 6/1995 | Yu ................................... 248/62 X |
| 5,443,232 | 8/1995 | Kesinger et al. ..................... 248/62 |

FOREIGN PATENT DOCUMENTS

| | | | |
|---|---|---|---|
| 2706187 | 12/1994 | France ............................... 403/289 |
| 0627249 | 10/1978 | U.S.S.R. ............................ 403/234 |

*Primary Examiner*—James W. Keenan
*Attorney, Agent, or Firm*—McAndrews, Held & Malloy, Ltd.

[57] ABSTRACT

A clamp connector for a front end loader includes a base member having a pair of jaw members extending therefrom. The jaw members terminate in a pair of substantially parallel fastener portions. Each of the fastener portions has an opening formed therein. The fastener portion openings align to receive a fastener extending therethrough. The jaw members are arcuately shaped such that a substantially cylindrical opening is formed therebetween. The base member has a relief opening formed therein. The relief opening communicates with the substantially cylindrical opening.

3 Claims, 4 Drawing Sheets

FIG. 3
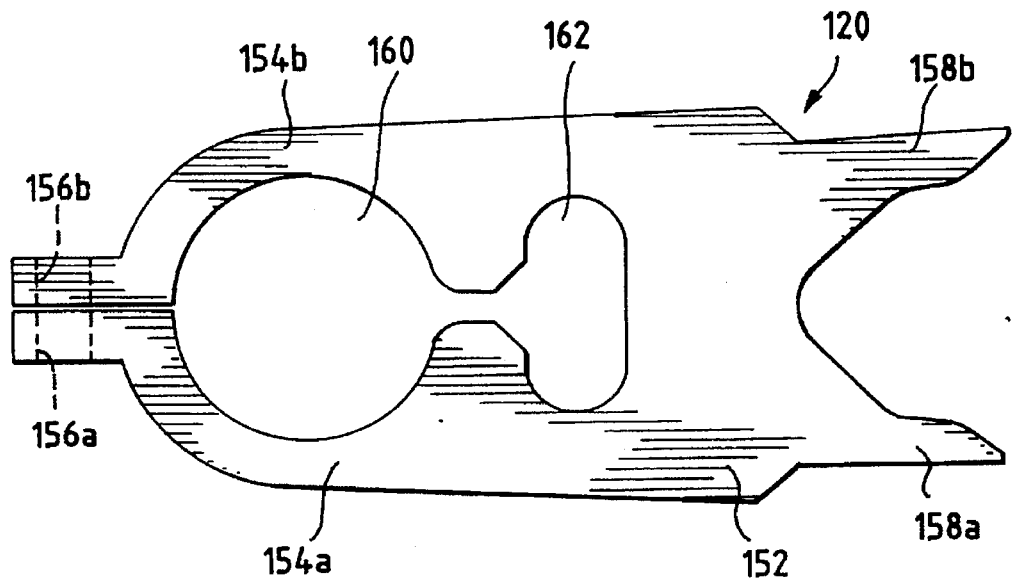
FIG. 5
FIG. 4
PRIOR ART
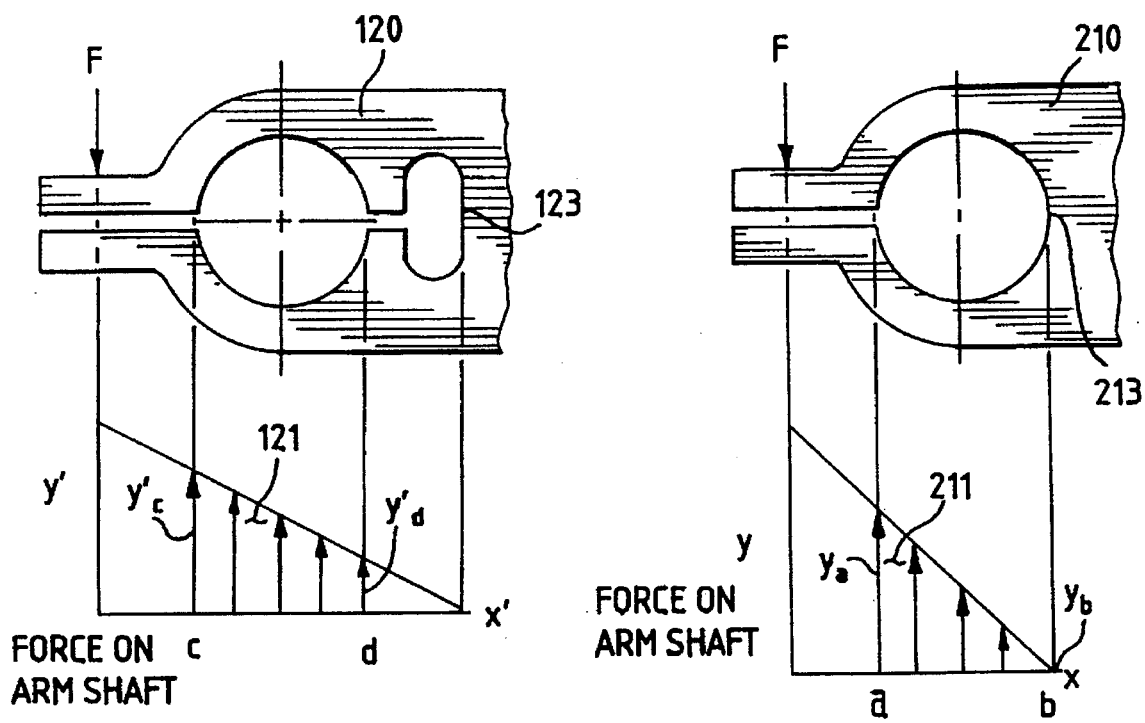

CLAMP CONNECTOR FOR A FRONT END LOADING REFUSE COLLECTION VEHICLE

FIELD OF THE INVENTION

The present invention relates to a front end loading refuse vehicle. More particularly, the present invention relates to a clamp connector for the arm cross-shaft of a front end loader.

BACKGROUND OF THE INVENTION

Front end loaders for refuse collection traditionally have two arms, one on each side of the chassis. The arms are generally pivotally attached at the lower front corners of the body and connected together by an arm cross-shaft at the proximal end of the front end loader, nearest the vehicle. The arms are also generally connected together by another member at the distal end of the front end loader, furthest from the vehicle body, where the mechanism for engaging and lifting a refuse container is located. The arm cross-shaft is generally journalled in bearings, one on each side of the body.

Forks extend from the distal ends of the arms, and are pivotally connected on a fork cross-shaft. The forks engage in the pockets of a refuse container. The container is then lifted when the arms and the forks are hydraulically actuated to rotate the container for dumping the contents of the container into the vehicle body. The arms are typically rotated by two arm cylinders, one on each side of the body. While forks are specifically employed in the present design, other similar engagement and lifting could also be employed in connection with the present clamp connector.

Since there is a potential for unequal loading on the arms due to unequal loading in the container or other similar conditions, the arms are typically fixed to the arm cross-shaft so that the arm cross-shaft can transmit torque from the lighter loaded arm to the heavier loaded arm. The fixing of the arms to the cross-shaft also assures that the arms are raised and lowered together. This fixing is traditionally accomplished by welding the arms to the arm cross-shaft or by bolting the arms to the arm cross-shaft using a flange extending from each arm and a flange extending from each of the opposite ends of the arm cross-shaft.

The traditional approach to fixedly attaching the arms to the arm cross-shaft has the following disadvantages:

(1) Welding the arms to the arm cross-shaft makes arm replacement extremely difficult because the entire assembly must be removed or the welds must be burned off the shaft, a time-consuming process likely to result in damage to the cross-shaft.

(2) The attachment of the arms to the cross-shaft by flanges makes arm replacement easier, but the flange design is heavy and costly.

(3) The arm cross-shaft is loaded in bending and torsion, and as a result, cross-shaft breakage is not uncommon due to stress raisers caused by the flange welding to the shaft or the arm welding to the shaft.

(4) For ease in servicing, split bearings and bushings are employed. This is an expensive and heavy design.

Past efforts to attach the arms of a front end loader to the arm cross-shaft by a clamping method have been unsuccessful because insufficiently uniform clamping force around the cross-shaft was available to resist the tendency of the arm to slip on the shaft during the transmission of torque, as described above.

SUMMARY OF THE INVENTION

The above and other disadvantages are overcome by a clamp connector for a front end loader. The connector comprises a base member having a pair of jaw members extending therefrom. The jaw members terminate in a pair of substantially parallel fastener extensions. Each of the fastener extensions has at least one opening formed therein. The fastener portion openings align to receive at least one fastener extending therethrough. The jaw members are arcuately shaped such that a substantially cylindrical opening is formed therebetween. The base member has a relief opening formed therein. The relief opening communicates with the substantially cylindrical opening.

In the preferred clamp connector, the at least one fastener is a threaded bolt.

The above and other disadvantages are also overcome by a front end loader assembly comprising a pair of arm members, an arm cross-shaft extending between the arm members, and a pair of clamp connectors extending from the arm members, as described above. In the preferred front end loader assembly, the jaw members contact the arm cross-shaft around substantially the entire circumferential surface of the arm cross-shaft.

The above and other disadvantages are further overcome by a refuse collection vehicle comprising a front end loader assembly, the assembly comprising:

(a) a pair of arm members pivotally attached at their proximal ends to the body of the front end loading vehicle, (b) an arm cross-shaft extending between the arm members at the proximal end of the arm members, and (c) a pair of clamp connectors extending from the arm members, as described above.

BRIEF DESCRIPTION OF THE DRAWINGS

FIG. 3 is a side elevation view of one of the clamp connectors illustrated in FIG. 2.

FIG. 4 is a side elevation view of a prior art clamp connector and a corresponding plot showing the distribution of forces along the length of the arcuate jaw members.

FIG. 5 is a side elevation view of the improved clamp connector shown in FIG. 3 and a corresponding plot showing the distribution of forces along the length of the arcuate jaw members.

DETAILED DESCRIPTION OF THE PREFERRED EMBODIMENTS

Figure 1:
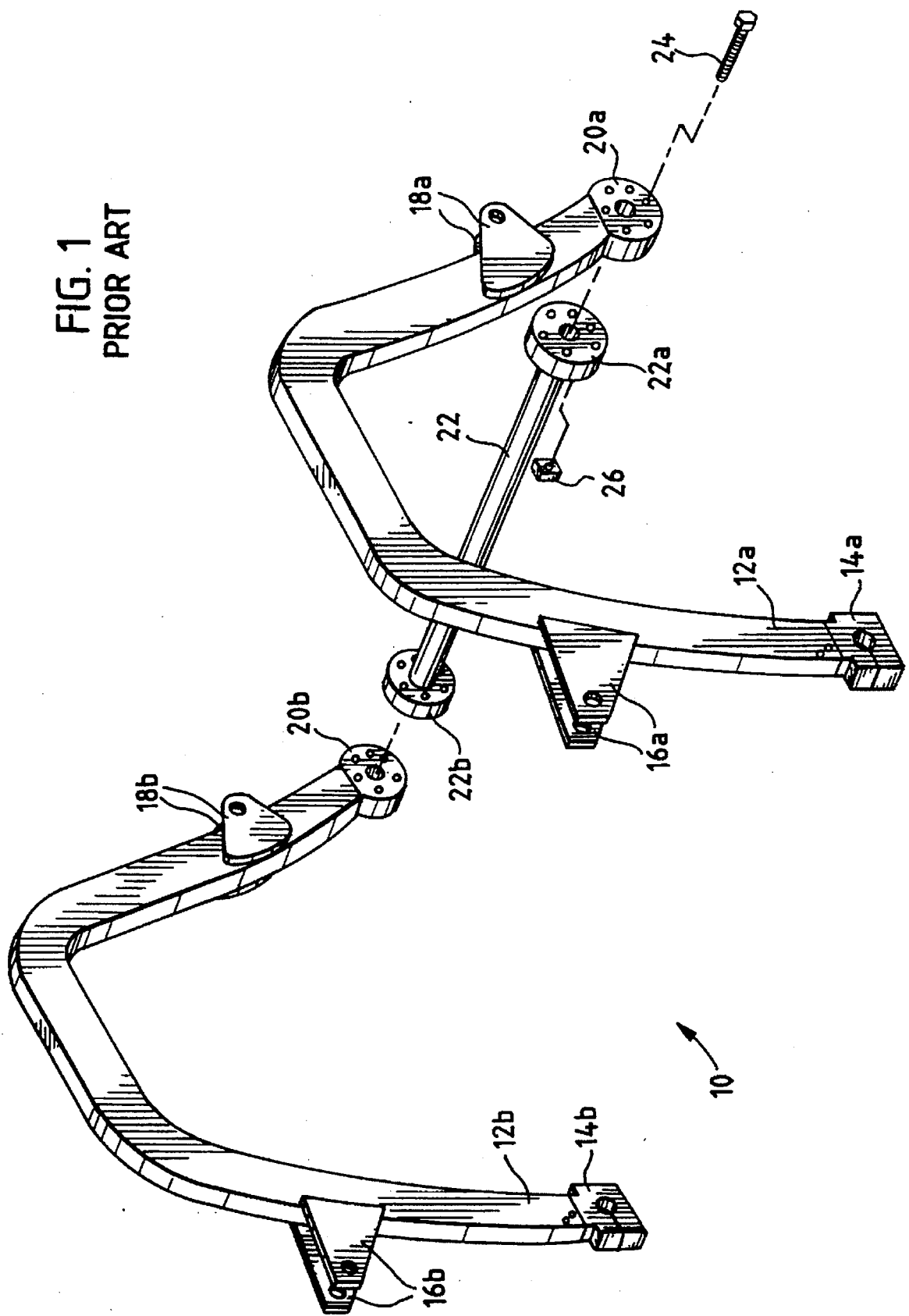
FIG. 1 is an exploded perspective view of a traditional, prior art front end loader assembly having arms bolted to the arm cross-shaft using a flange extending from each arm and a flange extending from each of the opposite ends of the arm cross-shaft.

Turning first to FIG. 1, a traditional, prior art front end loader arm assembly 10 includes two arms 12a, 12b. Each of arms 12a, 12b includes a pair of front plates 16a, 16b for pivotally attaching a hydraulic cylinder (not shown) for raising and lowering the forks (not shown) attached to the distal end of arms 12a, 12b, as well as a pair of rear plates 18a, 18b for pivotally attaching a hydraulic cylinder (not shown) to rotate arm assembly 10 up and down. Each of arms 12a, 12b has attached at its distal end a split bearing block 14a, 14b, respectively, for attaching a fork cross-shaft (not shown) to arms 12a, 12b.

As shown in FIG. 1, each of arms 12a, 12b has attached at its proximal end a flange 20a, 20b, each having a plurality of holes formed therein. An arm cross-shaft 22 has attached on opposite ends flanges 22a, 22b, each having a plurality of holes formed therein which align with the holes formed in flanges 20a, 20b. Arm 12a is fixedly attached to arm cross-shaft 22 by fasteners, one of which is shown in FIG. 1 as threaded bolt 24, through the holes formed in flanges 20a and 22a, and attaching a corresponding fastener, one of which is shown in FIG. 1 as threaded nut 26. Similarly, arm 12b is fixedly attached to arm cross-shaft 22 by extending fasteners through the holes formed in flanges 20b and 22b and attaching corresponding fasteners.

Figure 2:
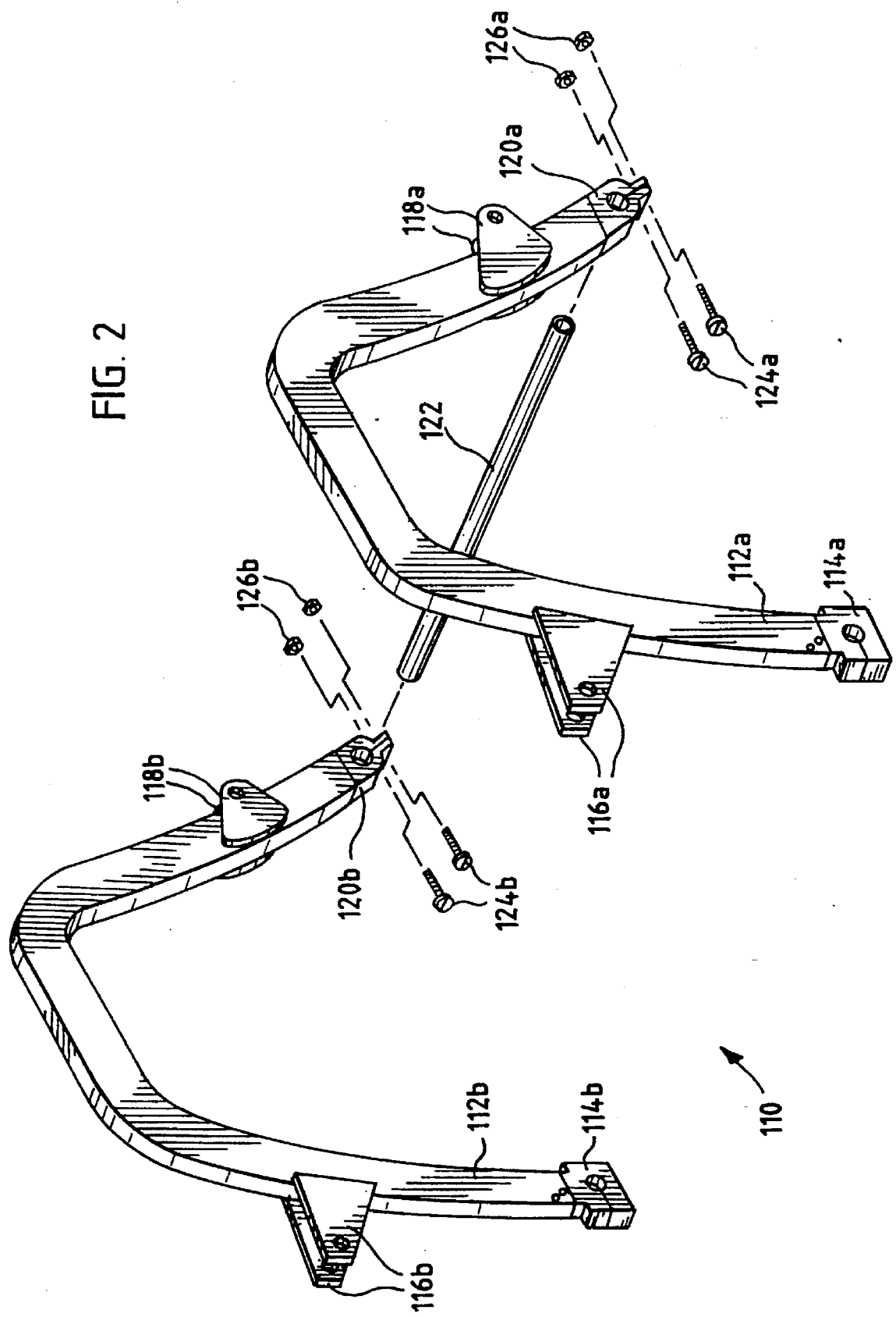
FIG. 2 is an exploded perspective view of the front end loader assembly according to the present invention, in which a clamp connector is employed to attach the arms to the arm cross-shaft.

Turning next to FIG. 2, a front end loader arm assembly 110 employs clamp connectors 120a, 120b to attach arms 112a, 112b to the arm cross-shaft 122. Each of arms 112a, 112b includes a pair of front plates 116a, 116b for pivotally attaching a hydraulic cylinder (not shown) for raising and lowering the forks (not shown) attached to the distal end of arms 112a, 112b, as well as a pair of rear plates 118a, 118b for pivotally attaching a hydraulic cylinder (not shown) to rotate the arm assembly 110 up and down. Each of arms 112a, 112b has attached at its distal end a split bearing block 114a, 114b, respectively, for attaching arms 112a, 112b to a fork cross-shaft (not shown).

As shown in FIG. 2, each of arms 112a, 112b has attached at its proximal end a clamp connector 120a, 120b for attaching arms 112a, 112b to the arm cross-shaft 122. Clamp connectors 120a, 120b are fixedly attached to each of arms 112a, 112b, for example, by welding. Fasteners, shown in FIG. 2 as threaded bolts 124a, 124b, extend through openings formed in clamp connectors 120a, 120b, respectively, and then into corresponding fasteners, shown in FIG. 1 as threaded nuts 126a, 126b, for clamping the connectors 120a, 120b around the arm cross-shaft 122.

FIG. 3 shows in more detail one of the clamp connectors 120 in FIG. 2. Clamp connector 120 includes a base portion 152 from which a pair of jaw members 154a, 154b extend. Jaw members 154a, 154b terminate in a pair of substantially parallel fastener extensions 156a, 156b, each of which has an opening or hole formed therein (shown in phantom lines in FIG. 3) for fasteners such as threaded bolt 124a and threaded nut 126a shown in FIG. 2.

As further shown in FIG. 3, a pair of attachment projections 158a, 158b extend from the base portion 152 for fixedly attaching connector 120 to its corresponding arm (not shown). As shown in FIG. 3, jaw members 154a, 154b are arcuately shaped or curved such that a substantially cylindrical opening 160 is formed therebetween to provide frictional clamping force around the circumference of the cross-shaft. As a result, torsional resistance to slip, a function of the frictional clamping force, is enhanced in the present design.

FIG. 3 shows a relief opening 162 formed in base portion 152. Opening 162 provides the connector with the ability to more uniformly clamp jaw members 154a, 154b around the cross-shaft held within opening 160, while reducing stress in the clamp section transmitting the clamping forces.

FIG. 4 is a side elevation view of a prior art clamp connector 210 and a corresponding plot showing the distribution of forces along the length of the arcuate jaw members. FIG. 5 is a side elevation view of the clamp connector 120 shown in FIG. 3 and a corresponding plot showing the distribution of forces along the length of the arcuate jaw members.

While not limited to the theory of operation presented herein, the plots of FIGS. 4 and 5 are a graphical comparison of resultant forces on a shaft when a given amount of force F is applied to the fastener extensions of a simple connector 210 and the improved connector 120. For the forces illustrated in FIG. 4 to balance, the integral of y times dx from point a to point b, as represented by shaded area 217, must equal F. For the forces in FIG. 5 to balance, the integral of y' times dx' from point c to point d, as represented by shaded area 121, must equal F. Thus, shaded areas 211 and 121 are equal. Note that points 213 and 123 serve as fixed pivot points in the configurations illustrated in FIGS. 4 and 5, respectively. Thus, y at point b is equal to zero and y' at point d is greater than zero. Since the distance from point a to point b equals the distance from point c to point d, it follows that y at point a is greater than y' at point c.

The net result of the above analysis is that the improved clamp connector 120 provides a more even force distribution and reduces the magnitude of the maximum resultant force. This allows a greater force F to be applied without increasing stress levels and results in greater frictional clamping force than can be applied by a simple split connector.

Figure 6:
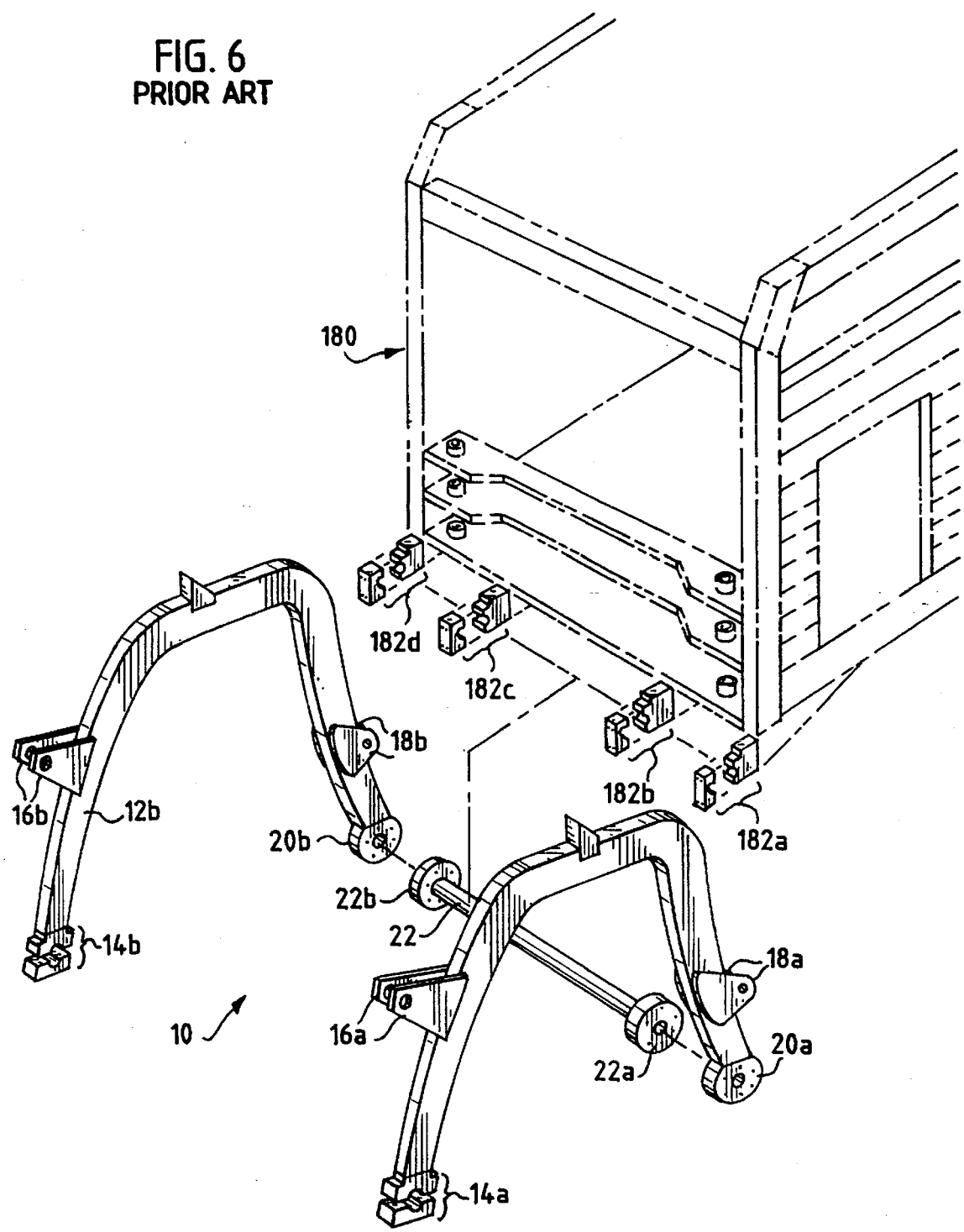
FIG. 6 is an exploded perspective view of the mounting of the traditional, prior art front end loader assembly of FIG. 1 on the split bearing blocks attached to the vehicle body.

FIG. 6 illustrates the mounting of the traditional, prior art front end loader assembly 10, illustrated in FIG. 1 and described above, within the split bearing blocks 182a, 182b, 182c, 182d attached to the vehicle body 180. As shown in FIG. 6, arm cross-shaft 22 is received and clamped within each of split bearing blocks 182a, 182b, 182c, 182d. Similarly, the front end loader assembly according to the present invention, illustrated in FIG. 2 as front end loader arm assembly 110 and described above, in which clamp connectors are employed to attach the arms to the arm cross-shaft, can also be conveniently mounted within split bearing blocks 182a, 182b, 182c, 182d attached to vehicle body 180.

The advantages of the present clamp connector for front end loaders are as follows:

(a) Ease of arm replacement in the field.

(b) Elimination of the weld stress raiser associated with welding flanges on the arm cross-shaft, as described above.

(c) Less expensive manufacturing costs over the flange design with its associated split bearing block, and approximately the same cost as the welded design.

(d) Lighter weight than the flange design.

(e) Hydraulic arm cylinders having expensive adjustable rod ends to take up minor manufacturing discrepancies, which occur when indexing or aligning the flange openings with the arm cross-shaft openings, are no longer necessary because the clamp can be loosened and the arm rotated on the cross-shaft. This change in cylinder design results in significant cost reduction.

(f) There is no longer a need for split bearings and split bushings for the arm cross-shaft, which can now be simple one-piece bushings and bearings, resulting in significant cost reduction.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A front end loader arm assembly comprising a pair of arm members, an arm cross-shaft extending between said arm members, and a pair of connectors extending from said arm members, each of said connectors comprising a base member having a pair of jaw members extending therefrom, said jaw members terminating in a pair of substantially parallel fastener extensions, each of said fastener extensions having at least one opening formed therein, said fastener extension openings aligned to receive at least one fastener extending therethrough, said jaw members arcuately shaped such that a substantially cylindrical opening is formed therebetween to receive said arm cross-shaft, said base member having a relief opening formed therein, said relief opening defined by interior facing base member walls, said relief opening communicating with said substantially cylindrical opening, a portion of said base member walls diverging as said walls are traversed in the direction away from said substantially cylindrical opening.

2. The front end loader arm assembly of claim 1 wherein said jaw members contact said arm cross-shaft around substantially the entire circumferential surface of said arm cross-shaft.

3. A refuse collection vehicle comprising a front end loader arm assembly, the assembly comprising:

(a) a pair of arm members pivotally attached at their proximal ends to said vehicle, (b) an arm cross-shaft extending between said arm members at the proximal end of said arm members, and (c) a pair of connectors extending from said arm members, each of said connectors comprising a base member having a pair of jaw members extending therefrom, said jaw members terminating in a pair of substantially parallel fastener extensions, each of said fastener extensions having at least one opening formed therein, said fastener extension openings aligned to receive at least one fastener extending therethrough, said jaw members arcuately shaped such that a substantially cylindrical opening is formed therebetween to receive said arm cross-shaft, said base member having a relief opening formed therein, said relief opening defined by interior facing base member walls, said relief opening communicating with said substantially cylindrical opening, a portion of said base member walls diverging as said walls are traversed in the direction away from said substantially cylindrical opening.

* * * * *